United States Patent [19]
Lambert

[11] 4,137,115
[45] Jan. 30, 1979

[54] JOINING STRUCTURE

[76] Inventor: Patrick Lambert, 144 Longmeadow Lane, State College, Pa. 16801

[21] Appl. No.: 849,285

[22] Filed: Nov. 7, 1977

[51] Int. Cl.² .............................................. F16B 13/00
[52] U.S. Cl. ..................................... 156/257; 156/293; 403/268; 403/287; 403/292; 46/161
[58] Field of Search ........................... 46/161, 173, 22; 403/266, 268, 287, 292, 298, 165, 164, 179; 144/314 R, 318, 315 R; 156/293, 257

[56] References Cited

U.S. PATENT DOCUMENTS

| | | | |
|---|---|---|---|
| 569,235 | 10/1896 | Rockwell | 403/298 X |
| 1,211,232 | 1/1917 | Read | 46/161 |
| 1,272,685 | 7/1918 | Levis | 46/22 |
| 1,619,368 | 11/1952 | Anderson | 403/164 |
| 1,793,890 | 2/1931 | Young et al. | 46/22 |
| 2,457,249 | 12/1948 | Lipschitz | 46/22 |
| 3,351,365 | 11/1967 | Bickl | 403/292 |

Primary Examiner—Andrew V. Kundrat
Attorney, Agent, or Firm—Ladas, Parry, Von Gehr, Goldsmith & Deschamps

[57] ABSTRACT

A pivotable and removably securable joining structure particularly suited for joining wooden structures including a first wooden member having a substantially cylindrical hole therein, and a second wooden member having disposed therein a substantially cylindrical dowel extending outwardly thereof and a pin located within the second member disposed substantially perpendicularly to the longitudinal axis of the dowel and extending through the dowel. The dowel is made of a plastic material and has a diametrical size substantially equal to the diametrical size of the cylindrical hole in the first member.

1 Claim, 6 Drawing Figures

JOINING STRUCTURE

BACKGROUND OF THE INVENTION

1. Field of the Invention

The present invention relates broadly to a novel joining means or structure which is readily adaptable for use in making wooden toys, and more particularly to a pivotal and removably securable joining structure for wooden members having a cylindrical plastic dowel which is for insertion into a complementary hole such that the effectiveness of the joining structure is not effected by varying temperatures and humidity. The joining structure made in accordance with the present invention is especially adapted for use in making toys such as dolls and the like whereby various wooden pieces may be disposed in a plurality of arrangements and configurations. The invention therefore provides for improved joining between the members at various angles, and can take the punishment and abuse normally associated with childrens toys.

2. Description of the Prior Art

Various attempts have been made in the past to produce joining means for wooden members by providing a lip on one member which is received by a complementary hole or slot on a second member to effect attachment. The use of a tenon and mortise has been utilized in the past but such means are not readily adaptable to provide pivotal movement and such arrangements produce sharp corners and are expensive to manufacture.

In the past, wooden pins or pegs and the like have been utilized by providing one member with such a pin and providing another member with a complementary corresponding hole. As the prior art materials for the pins are wood or wood products, it has been found that the tolerances cannot be controlled accurately, and during drying or moisture absorption of the wood dimensional size changes cause the joining means to become inoperable. Furthermore, temperature and moisture drastically effect the surface conditions of wood thereby causing a substantial drawback in that a consistently even tight fit between the surface of the pin and corresponding complementary hole cannot be maintained. The prior art connecting means are generally not adaptable safely for use in childrens toys.

SUMMARY OF THE INVENTION

The present invention overcomes the disadvantages of the prior art joining means by providing a pivotal and removabley securable joining structure particularly suited for joining wooden structures including a first wooden member having a substantially cylindrical hole therein, and a second wooden member having disposed therein a substantially cylindrical dowel extending outwardly thereof, and a pin located within the second member disposed substantially perpendicularly to the longitudinal axis of the dowel and extending through the dowel. The dowel is made of a plastic material and has a diametrical size substantially equal to the diametrical size of the cylindrical hole in the first member.

It is an object of the present invention to overcome the disadvantages of prior art joining means and provide a removable and rotatable connection which may be readily adaptable to various uses in wooden childrens toys or dolls and the like.

It is a further object of the present invention to provide a connection means having at least one plastic dowel connected to a wooden member which extends outwardly thereof. Furthermore, it is an object and within the scope of the present invention to provide a bevel on the end of the plastic dowel, and to bevel the surface of the wood defining the corresponding hole in order to provide easy insertion of the dowel into the corresponding hole.

It is still yet another object of the present invention to provide a means of affixing the dowel to the wooden member whereby a strong and durable rigid connection is obtained.

It is still yet a further object of the present invention to provide a removably and pivotably securable joining structure which is not affected by moisture and humidity.

Still further objects of the features of this joining structure reside in the provision of a structure that is simple in construction, and inexpensive to manufacture, thereby permitting wide use and distribution.

These together with the various ancillary object and features of the invention will become apparent as the following description proceeds, are obtained by the joining structure, a preferred embodiment of which is shown in the accompanying drawing, by way of example only, wherein:

DETAILED DESCRIPTION OF THE INVENTION

Figure 1:
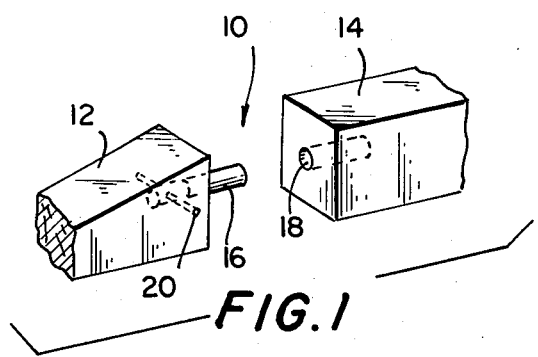
FIG. 1 is a perspective view of two wooden members incorporating a joint structure made in accordance with the present invention.

With continuing reference to the accompanying drawing wherein like reference numerals designate similar parts throughout the various views, reference 10 is used generally to designate the joint structure of the present invention used to join two wooden members 12 and 14.

The joining structure used to removably and pivotably join members 12 and 14 is especially adapted and particularly useful where such members are hard woods such as rock maple and the like. However, it must be understood that it is within the scope of the present invention that the members being joined may be of all types of woods as well as most man-made materials including cardboard, metal, and hard plastics such as the engineering plastic Delrin made by Du Pont.

With reference to FIG. 1, there is shown a substantially cylindrical dowel 16 which is partially disposed within member 12. The dowel 16 is intended to be inserted into a corresponding complementary hole 18 in member 14. Accordingly, the outside diameter of dowel 16 corresponds closely to the diameter of hole 18 as there must be created an interference or frictional engagement between the surface of the pin and the surface defining hole 18. It must be understood that if the surface of the dowel does not substantially coextensively engage the defining surface of hole 18, member 12 will not be secured to member 14. However, if dowel 16 is received in hole 18 such that it is forced or exerts excessive pressure outwardly on the surface defining hole 18, member 12 will not be readily manually removable from member 14 or rotatable with respect thereto. The proper amount of friction between the surfaces in question must be maintained substantially constant.

In order to provide for controlled and constant pressure between the dowel and member 14, dowel 16 is preferably of a rigid hard plastic material such as the plastic known as Delrin manufactured by Du Pont. The dowel 16 is disposed within member 12 a distance at least one-half the distance that the dowel extends outwardly from member 12. However, in order that dowel 16 be strongly held by member 12, the dowel may extend a length up to three times the length of the outwardly extending portion into member 12. An arrangement such that 50% of the length of the dowel extends outwardly of member 12 is preferred.

Figures 2, 3:
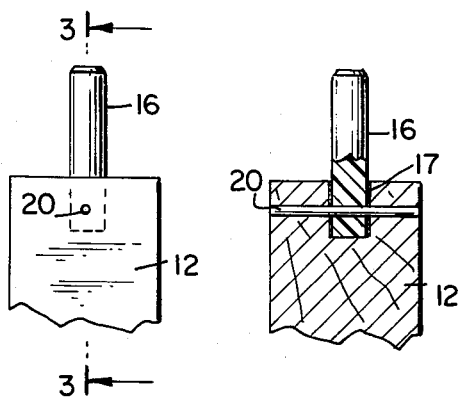
FIG. 2 is a partial elevational view of a wooden member including the dowel portion of the present invention.
FIG. 3 is a partial vertical cross-sectional view taken along the plane of line 3—3 in FIG. 2.

To facilitate insertion of the dowel 16 into hole 18 to effect joining of members 12 and 14, the outer edge of the dowel is beveled as may be readily seen in FIGS. 2 and 3. The bevel is preferably 45°, but may extend from 30° and 60°, with respect to the longitudinal axis of said dowel.

Correspondingly, the outer edge of the wood defining hole 18 may be shaped or beveled as shown at 19 to provide for easy insertion of the dowel. The depth of hole 18 into member 14 may be long enough to receive completely the length of the dowel extending outwardly of member 12. However, it is also intended that the length of the hole 18 (distance into the member 14) may be less than the length of dowel extending outwardly of member 12 so that the member 12 and 14 will not engage, but still be removably and rotatably affixed.

In order to durably secure dowel 16 in member 12 a pin 20 is disposed through member 12 extending completely through dowel 16. As readily seen in FIG. 3, the pin 20 is disposed substantially perpendicularly to the longitudinal axis of dowel 16. Preferably, the pin passes through a point along the longitudinal axis of the dowel in order to provide maximum strength. The pin 20 preferably extends substantially from each side edge of member 12. However, the pin may be recessed beneath the surface of member 12 for cosmetic reasons. Pin 20 must be of a diameter smaller than that of the dowel in order to pass therethrough without severing the dowel, and preferably, the diameter of pin 20 is from 10 to 75 percent the diameter of the dowel.

Figure 4:
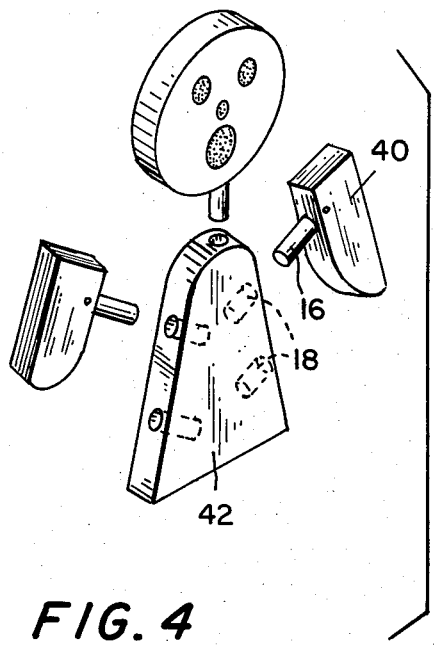
FIG. 4 is a perspective view of several components embodying the present invention.

With reference to FIG. 4, it is depicted how the joint structure of the present invention might be utilized for the construction of a wooden doll, or the like. The dowel 16 attached to a wooden arm member 40 would be disposed in the corresponding holes 18 in the body member 42, whereby the arm 40 could be placed where desired. Once the dowel 16 is disposed within any corresponding hole 18 the novel joint structure of the present invention would allow the arm member 40 to be retained in any given position, against the action of gravity, and could be rotated manually to any desired position. Furthermore, the present invention could be used to secure ornamentation or further members, such as a head or the like to the body member 42.

Figure 5:
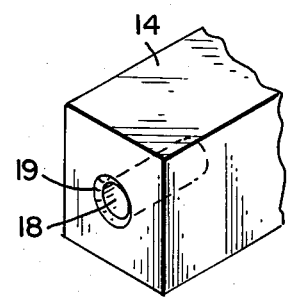
FIG. 5 is a perspective view of a wooden member including the dowel receiving hole.

In practice, the hole 18 could be made in a wooden member by the use of a common drilling operation or by a punch press or the like. The beveling of the surface surrounding hole 18, such as at 19 in FIG. 5, could be done manually or by some sort of shaping or grinding apparatus.

In order to secure pin 16 within the wooden member 12, in practice, a hole could be made in the member by the use of a drill whereupon glue or other suitable adhesive 17 could be disposed therein, and then the pin disposed into the hole. However, in order to secure the pin in such a fashion as to be extremely durable and suitable for toy construction and the like, once the pin is disposed within the hole of a closely corresponding diameter, with or without glue being inserted therein, a hole could be drilled through the wood member and the dowel and a pin inserted therein, with or without the use of a suitable adhesive used to secure the pin in member 12. The size hole through which pin 20 is disposed may be such that adhesive or glue is not needed.

Figure 6:
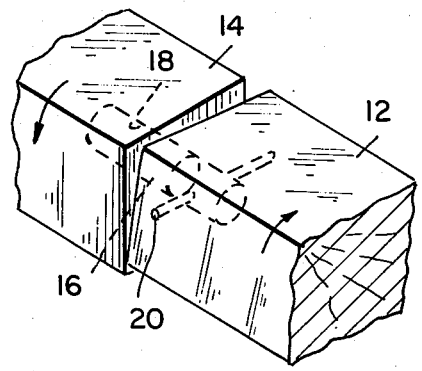
FIG. 6 is a perspective view of two wooden members joined by the dowel of the invention.

It must be noted that the hole 18 must correspond closely to the diameter of the dowel 16 which is of substantially circular cross-sectional configuration. It is intended that the dowel 16 not rotate or evidence lateral movement of any portion thereof (wobble), even when pressure or force is exerted laterally thereto. The present invention allows the respective members joined by the novel joining device 10 to rotate while still being retained in engaging or spaced relation, such as indicated in FIG. 6 with the dowel 16 evidencing any movement will respect to member 12.

A latitude of modification, substitution and change is intended in the foregoing disclosure, and in some instances some features of the present invention may be employed without a corresponding use of other features and still remain within the scope, spirit and intent of the present invention.

I claim:

1. A method of securing wooden structures comprising the steps of creating a substantially cylindrical hole in a first wooden member, creating a substantially cylindrical hole in a second member, disposing a substantially cylindrical elongated plastic dowel into said hole in said second member wherein the diameter of said dowel is substantially equal to the diameter of said hole in said first member, disposing a pin through said second member and said dowel substantially perpendicularly to the longitudinal axis of said dowel, disposing at least a portion of said dowel extending outwardly of said second member into the hole in said first member, and inserting adhesive into said hole in said first member prior to the insertion of said dowel therein.

* * * * *